UNITED STATES PATENT OFFICE.

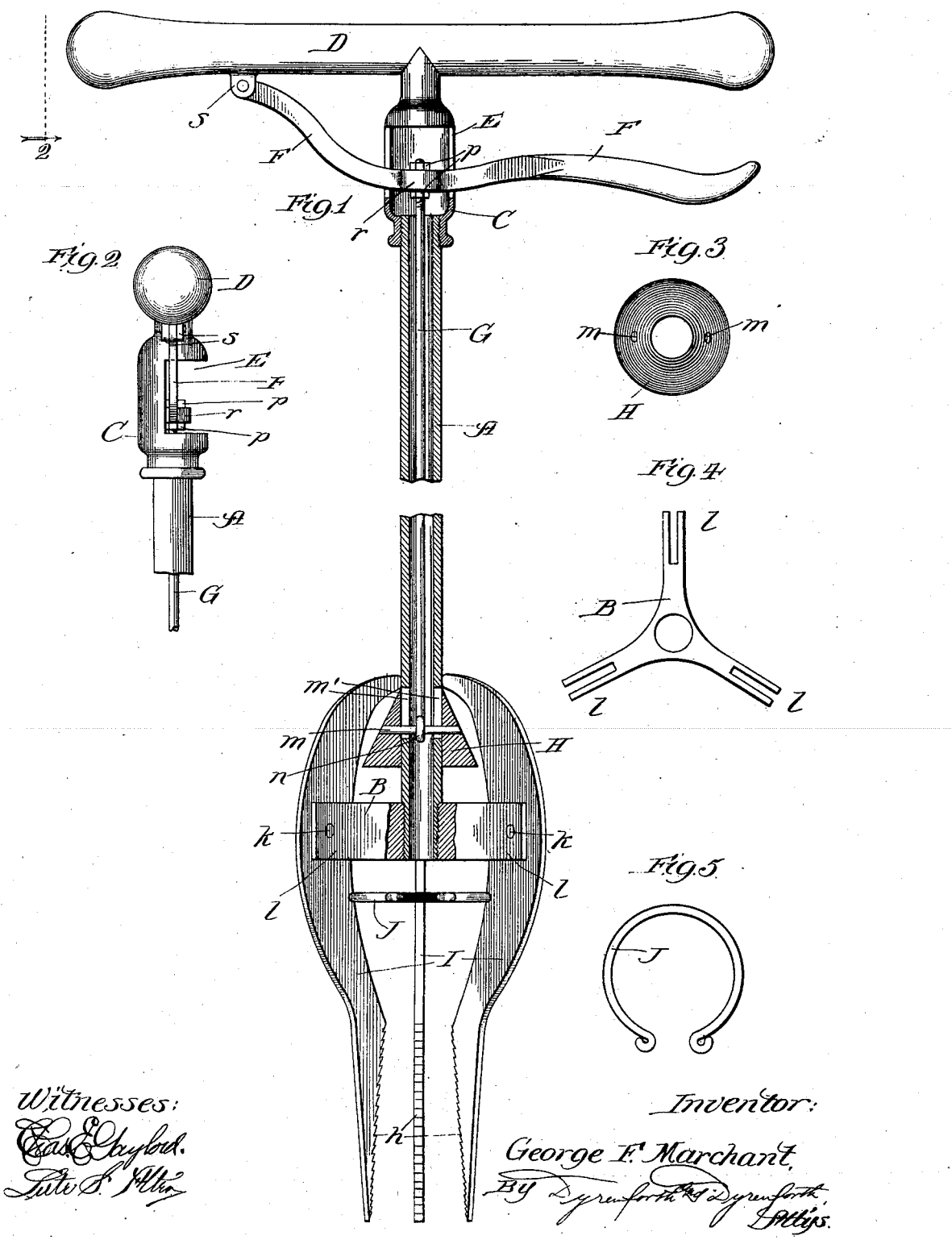

GEORGE F. MARCHANT, OF CHICAGO, ILLINOIS.

WEEDING DEVICE.

SPECIFICATION forming part of Letters Patent No. 654,904, dated July 31, 1900.

Application filed August 15, 1898. Renewed May 31, 1900. Serial No. 18,641. (No model.)

*To all whom it may concern:*

Be it known that I, GEORGE F. MARCHANT, a citizen of the United States, residing at Chicago, in the county of Cook and State of Illinois, have invented a new and useful Improvement in Weeding Devices, of which the following is a specification.

My invention is in the nature of an improved weeding device for use more especially on lawns for weeding out dandelions or other plants or weeds injurious to the lawn.

My object is to provide a weeding device of simple construction and of easy and effective operation and cheaply manufactured.

In the accompanying drawings, Figure 1 is a view, partly in section, of my improved weeding device in its preferred form; Fig. 2, a view in end elevation of the upper portion of the device viewed as indicated by the arrow on line 2 of Fig. 1; Fig. 3, a plan view of the cone which serves to operate the weeding-prongs; Fig. 4, a plan view of a triangular bracket to which the prongs are pivoted, and Fig. 5 a plan view of a spring which serves to separate the prongs when their upper ends are released by the downward movement of the cone.

A represents a standard, which may be conveniently formed from half-inch tubing, the lower end of which screws into the triangular bracket B and the upper end of which is surmounted by a sleeve-like head C, carrying a handle D. A portion of the sleeve C is cut away to afford a channel E, within which moves a lever F, fulcrumed at one end in a slotted lug $s$ on the lower side of the handle D and provided centrally with a perforated boss $r$, through which passes the upper end of the connecting-rod G. The connecting-rod is adjustably secured at its upper end to the lever F by means of nuts $p$ and at its lower end is provided with a hook or loop $n$, through which passes a pin $m$, moving in a slot $m'$ in the pipe A and extending into an annular cone H, which moves on the pipe A.

The bracket B is provided with slotted radial arms $l$, in which are fulcrumed at points $k$ comparatively-thin vertically-disposed collapsible weeding-prongs I, preferably three in number, located one hundred and twenty degrees apart. The prongs are provided with incurved upper ends which ride upon the inclined surface of the cone H and at the other ends are provided with toothed inner edges $h$, which are preferably upwardly and inwardly convergent when the prongs are open and approximately parallel when the prongs are closed.

J is a circular spring disposed horizontally between the prongs beneath their fulcrums and serving to hold the prongs normally in an open position. The spring is held in place by fitting at its points of contact in grooves at the inner edges of the prongs.

The handle D and sleeve C are preferably integrally formed, being cast hollow to render them sufficiently light. The serrations on the prongs I preferably project inwardly and upwardly, so as to take hold readily upon the plant which is to be extracted. The lower ends of the prongs should be thin enough to move through the earth without the exertion of too much force upon them, and yet should be thick enough to grasp rather than cut the stem.

The operation is as follows: The prongs are held normally open at their lower ends by the spring J. When a plant is to be pulled, the device is set with the prongs encircling it and is shoved down by means of the handle into the ground a sufficient distance, after which the lever F is raised, drawing the rod G, and through its medium the cone H, upward, thereby throwing the upper ends of the prongs outward, causing the serrated inner edges of the lower ends of the prongs to take hold of the stem of the plant, when the latter can be readily jerked out. When the lever F is released, it drops downward, releasing the upper ends of the prongs from engagement with the cone and allowing the spring J to separate the prongs at their lower ends.

Changes in details of construction within the spirit of my invention may be made.

What I claim as new, and desire to secure by Letters Patent, is—

In a weeding device, the combination of a standard pipe provided toward its lower end with a slot, a bracket secured to the lower end of the pipe, an annular cone fitting slidingly upon said pipe at the slotted portion, a connecting-rod within the pipe, means joining the connecting-rod and cone, a handle for the device, means for actuating the connecting-rod, prongs pivoted to the arms of said bracket provided with upper ends in contact with said cone, and means for spreading the lower ends of the prongs when the connecting-rod is lowered, substantially as and for the purpose set forth.

GEORGE F. MARCHANT.

In presence of—
D. W. LEE,
R. T. SPENCER.